United States Patent
Andries et al.

(10) Patent No.: US 8,996,717 B2
(45) Date of Patent: Mar. 31, 2015

(54) CLUSTERED SYSTEM FOR STORING DATA FILES

(75) Inventors: Luc Maria Jozef Andries, Borgerhout (BE); Piet Marie Alfons Rosa Demeester, Ghent (BE)

(73) Assignee: SDNSquare, Korbeek-Lo (BE)

( * ) Notice: Subject to any disclaimer, the term of this patent is extended or adjusted under 35 U.S.C. 154(b) by 152 days.

(21) Appl. No.: 13/145,861

(22) PCT Filed: Jan. 21, 2010

(86) PCT No.: PCT/EP2010/050676
§ 371 (c)(1),
(2), (4) Date: Aug. 29, 2011

(87) PCT Pub. No.: WO2010/084147
PCT Pub. Date: Jul. 29, 2010

(65) Prior Publication Data
US 2012/0066407 A1    Mar. 15, 2012

Related U.S. Application Data

(60) Provisional application No. 61/146,480, filed on Jan. 22, 2009.

(30) Foreign Application Priority Data

Jun. 2, 2009    (EP) .................................... 09161656

(51) Int. Cl.
| | |
|---|---|
| G06F 15/16 | (2006.01) |
| H04L 12/801 | (2013.01) |
| H04L 12/24 | (2006.01) |
| H04L 12/26 | (2006.01) |

(Continued)

(52) U.S. Cl.
CPC ............ *H04L 47/10* (2013.01); *H04L 41/5009* (2013.01); *H04L 41/5025* (2013.01); *H04L 41/5035* (2013.01); *H04L 41/509* (2013.01); *H04L 43/0829* (2013.01); *H04L 47/11* (2013.01); *H04L 47/17* (2013.01); *H04L 47/2441* (2013.01); *H04L 65/80* (2013.01); *H04L 67/1097* (2013.01)
USPC .......................... 709/232; 370/229; 370/241

(58) Field of Classification Search
CPC ....................................................... H04L 47/10
USPC .......... 709/222, 224, 226, 228, 232; 711/154, 711/170; 707/10; 370/469, 466, 395.53, 370/229, 241
See application file for complete search history.

(56) References Cited

U.S. PATENT DOCUMENTS

| | | | |
|---|---|---|---|
| 7,949,766 B2 * | 5/2011 | Bakke et al. ................... | 709/228 |
| 2002/0165964 A1 * | 11/2002 | Chen et al. ..................... | 709/226 |

(Continued)

OTHER PUBLICATIONS

White Paper, CISCO, Lossless 10 Gigabit Ethernet: The Unifying Infrastructure for SAN and LAN Consolidation, May 2009, p. 1-9.*

(Continued)

*Primary Examiner* — Jungwon Chang
(74) *Attorney, Agent, or Firm* — Workman Nydegger

(57) ABSTRACT

A clustered system arranged for supporting a clustered file system. The clustered system comprises at least two nodes and is characterised in that these at least two nodes are arranged for exchanging data traffic of the clustered file system between each other via an IP protocol over a lossless Ethernet network.

16 Claims, 10 Drawing Sheets

(51) Int. Cl.
*H04L 12/851* (2013.01)
*H04L 29/06* (2006.01)
*H04L 29/08* (2006.01)

(56) References Cited

U.S. PATENT DOCUMENTS

| | | | |
|---|---|---|---|
| 2006/0087989 A1 | 4/2006 | Gai et al. | |
| 2006/0212453 A1* | 9/2006 | Eshel et al. | 707/10 |
| 2006/0236063 A1* | 10/2006 | Hausauer et al. | 711/170 |
| 2006/0251067 A1 | 11/2006 | DeSanti et al. | |
| 2007/0088703 A1* | 4/2007 | Kasiolas et al. | 707/10 |
| 2007/0104102 A1 | 5/2007 | Opsasnick | |
| 2008/0133852 A1* | 6/2008 | Grier et al. | 711/154 |
| 2009/0063665 A1* | 3/2009 | Bagepalli et al. | 709/222 |
| 2009/0106255 A1* | 4/2009 | Lacapra et al. | 707/10 |
| 2009/0161692 A1* | 6/2009 | Hirata et al. | 370/466 |
| 2009/0285234 A1* | 11/2009 | McConnell et al. | 370/469 |
| 2009/0292813 A1* | 11/2009 | Snively et al. | 709/228 |
| 2011/0044344 A1* | 2/2011 | Hudson et al. | 370/395.53 |
| 2011/0131322 A1* | 6/2011 | Aust et al. | 709/224 |

OTHER PUBLICATIONS

International Search Report for PCT/EP2010/050676, Completed by the European Patent Office on Mar. 10, 2010, 3 Pages.

"Unified Fabric: Cisco's Innovation for Date Center Networks", http://www.cisco.com/web/DEpdfs/solutions/Cisco_DCE_WP.pdf, 2008, English translation attached to original, All together 20 Pages.

"Finre Channel over Ethernet Storage Networking Evolution", http://www.cisco.com/en/US/prod/collateral/switches/ps5718/ps6021/white_paper_c11-474771.pdf, 2008, 6 Pages.

* cited by examiner

CLUSTERED SYSTEM FOR STORING DATA FILES

CROSS-REFERENCE TO RELATED APPLICATION

This application is the U.S. national phase of PCT Appln. No. PCT/EP2010/050676 filed Jan. 21, 2010, which claims the benefit of U.S. provisional application 61/146,480 filed Jan. 22, 2009, and European application 09161656.5 filed Jun. 2, 2009, the disclosures of which are incorporated in their entirety by reference herein.

FIELD OF THE INVENTION

The present invention generally relates to the field of storing data files, in particular media files, on a clustered system.

BACKGROUND OF THE INVENTION

The advent and maturing of Internet technology over the last few decades has totally changed the landscape of the information technology (IT) industry. The absolute success and popularity of (mostly Ethernet based) Internet Protocol (IP) networks has promoted this technology as the prime architectural choice in most IT environments. Central mainframe computers have in most cases been replaced by distributed client-server architectures connected by very powerful IP networks.

This technology has steadily found its way in the media industry as well. IP based architectures are now fully accepted as the standard solution for file based media production and have drastically changed the way broadcasters operate and function internally. Applying an ICT based infrastructure and IP networks as means of transport in video/media production in particular, introduces a number of substantial possible benefits, facilitating the fundamental shift from traditional tape-based video manipulation to a file-based production paradigm. This technology leap enables video to be treated, processed, stored and transported as ordinary files independent of the video format, instead of the continuous streams used by the classical media technology of today. This evolution has drastically changed the media infrastructure technology towards central disk-based media storage. Many broadcasters have adopted a tape-less TV production vision since. This idea is further supported by the appearance of camera devices with storage facilities other than the traditional videotapes, e.g. optical disks (Sony) or Solid State memory cards (Panasonic).

Typically camera crews now enter the facilities with their video stored as ordinary files on memory cards in stead of on video tape. The memory cards are put into ingest stations, e.g. ordinary PCs, and the files are transferred as fast as possible, preferably faster than real time, into a central disk based storage system. Once stored in the central system, everybody can access the material simultaneously.

Storage is one of the most important media services in a file-based media environment. As with IP networking in media, media storage requirements largely differ from the classical IT storage solutions. Although architectures based on generic IT storage components are preferred above very expensive proprietary less-reliable media solutions, mainly because of economics of scale, reliability, cost, etc. . . . , media poses very high requirements on the file system. These special file system requirements are needed because of extreme characteristics in terms of (parallel) throughput, storage capacity, scalability, redundancy, availability and reliability, etc. . . . .

IBM's General Parallel File System (GPFS) is one of the most powerful media file systems available on the market today. It is a file management infrastructure providing high performance and reliability with scalable access to critical file data. In addition to providing file storage capabilities, GPFS provides storage management, information life cycle management tools, centralized administration and allows for shared access to file systems from remote GPFS clusters. GPFS provides scalable high-performance data access from a single node cluster, a two node cluster providing a high availability platform supporting a database application, for example, to 2000 nodes or more. GPFS was designed from the beginning to support high performance parallel applications and has since been proven very effective for a variety of applications.

Traditionally, the storage industry builds very scalable storage clusters (2) (i.e. groups of nodes for storage purposes) based on a classical Fibre Channel (FC) Storage Area Network (SAN) network architecture (see FIG. 1) using the FC protocol for transport of storage traffic. This architecture typically scales throughput together with storage capacity, i.e. if one requires more throughput, more disks are required and vice versa for capacity increases. Since it is based on high end storage systems (10), the solution is quite expensive. In the end, the Fibre Channel network typically becomes the scalability bottle neck of this classical IT architecture when heavily loaded with media traffic.

However, many essential media services require a processing power platform close to the storage service, such as transcoding and rewrapping services. This leads to the definition of many distinct storage services each with its particular characteristics. Hence, one can distinguish e.g. primary capacity storage suited for HD (high definition), SD (standard definition), low resolution video and audio, secondary disk-based and tape-based storage with high volume but low cost for backup and recovery, ingest storage, central editing storage, temporary storage, distribution storage, etc. Hence, there is a need for a cost-effective fit-for-purpose storage cluster architecture that can provide independent and tuneable scaling for processing power, throughput, storage capacity and availability, preferable using low-end cheap commodity components.

A GPFS cluster based on a 'network attached node' (NAN) model perfectly fulfils these requirements (see the example of FIG. 2). A GFPS cluster based on the NAN node model consists of storage cluster nodes (4) and network attached cluster nodes (6). The storage servers (4) have local storage or are directly connected to an external storage system (10), either locally attached or via a SAN architecture. NAN nodes are via a cluster network connected to all storage nodes, but are not directly attached to the underlying storage system (10). Each storage node is a primary server for part of the total storage. The NAN node stripes its data requests over all storage nodes, thereby aggregating the available bandwidth of each individual storage node and connected storage subsystems.

Initially, the network protocol and architecture for the cluster network was TCP/IP. It has been demonstrated that the same traffic could be passed unaltered over Infiniband (IB) via IPoIB. In a later version, IB verbs, also sometimes called native IB, became supported. The cluster depicted in FIG. 2 uses IB (5) as cluster network.

The cluster can be independently scaled for processing power by reinforcing the NAN nodes in terms of CPU or increasing the number of NAN nodes in the cluster. If more throughput is required, the cluster network can be scaled to higher bandwidths, e.g. from single data rate Infiniband (SDR) to double data rate (DDR) and in the future to quadruple data rate (QDR). The throughput to the clients can be augmented by adding NAN nodes. The storage throughput can be optimised by using faster disks or increasing the number of storage nodes. The pure storage capacity can be scaled by using larger hard disks, putting more storage under each storage node or increasing the number of storage nodes. Every component in the cluster can be made redundant to avoid any single point of failure. On top of that, GPFS has the concept of failure groups to further protect the storage system.

The data storage traffic over the cluster network (i.e. the network interconnecting the storage nodes with the NAN nodes) can be considered as a particular case of media traffic. In order to boost up the hard disks for media use, the segment size of the disks should be set as large as possible. The disks are combined in a Redundant Array of Independent Disks (RAID) protection configuration. This results in very large I/O block sizes, typically 4 MB, transported by the file system over the cluster network. Hence, this is a case of extremely bursty traffic.

Both in reading and writing operations the cluster network displays a many-to-one traffic pattern. When a NAN node reads from the storage nodes, all the storage nodes respond at the same time back to the NAN node with large bursts of traffic. If, on the other hand, multiple NAN nodes write data to the storage, the receiving storage nodes are simultaneously addressed by the bursts of all the writing NAN nodes. Both cases result in heavy oversubscription of the cluster network. Since high efficiency is of extreme importance in a media storage architecture, packet-loss and the resulting retransmissions by TCP are heavily penalised and should be avoided at all cost. Some media file systems using an IP network as cluster network try to remediate this by using UDP. They count on very large switch buffers to overcome the packet loss due to the oversubscription. This is only effective if the number of devices actively participating in such cluster architecture is relatively small, and pre-fetching is not used aggressively. However, this puts heavy restraints on the maximum throughput and fails when too many traffic requests interfere with each other.

In the case of GPFS, TCP/IP was originally used as protocol stack. This allows for flow control, but at the cost of limiting maximum throughput. As the most prevailing network technology for TCP/IP is Ethernet based, packet loss in the Ethernet network leads to retransmissions and further limits throughput efficiency. For this particular type of traffic the network technology used by Fibre Channel or Infiniband is very effective. Their flow control mechanism is based on buffer-to-buffer credits to eliminate packet loss completely in case of oversubscription. Credits of available buffers are continuously exchanged between ports on the same link. When no buffer credits are available, no packets are transmitted, until the network processes its congestion and buffers become available again.

Hence, the above depicted cluster uses Infiniband as cluster network technology. This is a very cheap technology with high bandwidth. The net data bandwidth is 8 Gb/s for SDR-IB and 16 Gb/s for DDR-IB. The capability of the PCI express bus becomes the next bottleneck. Also, the Buffer-to-Buffer credit flow control mechanism on all traffic on the link at the same time poses a constraint on the linear scalability of such a solution.

The Infiniband stack is extremely efficient for Linux based servers, reaching the full physical limits of the underlying bus-technology. The processing of the protocol stack is fully offloaded in the Host Channel Adapter (HCA), the IB network cards. Even remote direct memory access (RDMA) is fully supported and exploited. This leads to a very powerful cluster architecture, extremely well adapted for the file-based media production environment.

However, many media client applications require a Microsoft Windows operating system. This is both the case for Windows applications that have to run on the NAN cluster nodes, as for applications that require a mount of the central file system via the Common Internet File System (CIFS) protocol. Recently, IBM added a GPFS on Windows client to its NAN node configuration. This allows for a Microsoft Windows 2003 or 2008 Server to participate as a NAN node in the GPFS cluster. The state of the art Infiniband stack for Windows machines is presently however much less performing than the Linux flavour. The cluster protocol stack has to fall back to using IPoIB without any offloading, since not all GPFS commands are yet supported in the native IB stack for Windows. This decreases the performance of the cluster network by a factor of five.

Recently, some new developments supported by some of the leading IP networking companies have led to the definition and implementation of Data Centre Ethernet (DCE). Data Centre Ethernet is a term that refers to enhancements to Ethernet bridges that enable lossless LAN and SAN connectivity over an Ethernet network. With the term 'lossless' is meant that the Ethernet bridges (i.e. switches) do not lose frames under congestion. DCE, also known as CEE, Converged or Convergence Enhanced Ethernet, or as DCB, Data Centre Bridging, describes an enhanced Ethernet that enables convergence of various applications in data centres (LAN, SAN, high-performance computing) onto a single interconnect technology.

DCE is known in the art, for example from Cisco patent application US2006/251067, wherein a Data Centre Ethernet network and related methods and device are provided in the context of Fibre Channel over Ethernet. A DCE network simplifies the connectivity of data centres and provides a high bandwidth, low latency network for carrying Ethernet, storage and other traffic.

In the Cisco whitepaper "Data Center Ethernet: Cisco's Innovation for Data Center Networks" an overview of DCE is provided. In the past, separate physical network infrastructures were being deployed beside each other to support different traffic types, such as a Fibre Channel network for storage traffic, a classical lossy Ethernet network for IP data traffic or iSCSI storage traffic and an IB network for cluster traffic. Each network technology has different characteristics matching its application. DCE supports multi-protocol transport over one and the same Ethernet network fabric to consolidate these different applications and protocols on the same physical network infrastructure. It does so by defining a PFC (Priority-based Flow Control) mechanism to distinguish different traffic classes and to pause selectively a certain traffic class while continuing the transmission of other traffic classes on the same link. A "no-drop"-service class can be defined for FC traffic over the Ethernet link (FCoE) providing a lossless Ethernet fabric for the FC protocol based storage traffic, while other Ethernet traffic is transported in the normal lossy way. Linked to the PFC classification bandwidth provisioning per priority can be introduced. Optimal use of the available physical bandwidth can be enhanced by the introduction of Layer 2 Multipathing, increasing the throughput and scalability of Layer 2 Ethernet network topologies. Layer 2 is the well known data link layer of the seven layer OSI model.

Cisco application US2006/087989 provides methods and devices for implementing a Low Latency Ethernet solution, also referred to as a Data Centre Ethernet solution, which simplifies the connectivity of data centres and provides a high bandwidth, low latency network for carrying Ethernet and storage traffic. Some preferred implementations of the disclosure implement multiple virtual lanes (VLs) in a single physical connection of a data centre or similar network. Some VLs are "drop" VLs, with Ethernet-like behaviour, and others are "no-drop" lanes with FC-like behaviour. Active buffer management allows for both high reliability and low latency while using small frame buffers.

Cisco's whitepaper "Fibre Channel over Ethernet Storage Networking Evolution" describes the different evolutionary phases to introduce Fibre Channel over Ethernet (FCoE) in replacement of classical FC network environments by a unified Ethernet fabric. First FCoE is implemented at the server end to enable standalone servers to communicate with FC-attached storage systems using the traditional FC protocol but over a single unified Ethernet interface and cabling, thereby preserving the existing SAN operating and management model. In a second phase Cisco predicts that also blade servers will make use of that same principle and that FC switches will offer support for FCoE. In a third phase, storage arrays and tape libraries will support native FCoE interfaces. This enables the LAN and FCoE SAN traffic to converge onto a single, unified network fabric in the future.

AIMS OF THE INVENTION

The present invention aims to provide a highly scalable high performance clustered system for storing files, in particular media files, based on the widely accepted Ethernet based network technology.

SUMMARY

The present invention relates to a clustered system supporting a clustered file system. With clustered system is meant a set of connected computers that works like a single system. A clustered file system is a file system which can be simultaneously mounted via multiple servers. The clustered system comprises at least two nodes and is characterised in that the at least two nodes are arranged for exchanging data traffic of the clustered file system between each other via an IP protocol over a lossless Ethernet network. This lossless Ethernet network is preferably a Data Centre Ethernet based network.

In a most preferred embodiment this lossless Ethernet network is arranged to make use of a Priority Flow Control mechanism to map different traffic flows on a plurality of lossless IP over Ethernet traffic classes, providing said different traffic flows, possibly each of said traffic flows, an independent flow control mechanism. Note that multiple traffic flows can be mapped onto a same lossless IP over Ethernet traffic class. In this way interference between the different traffic flows caused by oversubscription in the network is reduced and preferably eliminated and the scalability of the clustered system is increased.

In a preferred embodiment at least one node of the clustered system is a storage node arranged for storing at least a part of the clustered file system. In one embodiment the storage node comprises local storage means. In another embodiment the storage node is arranged for being connected to external storage means. These two options may possibly be combined.

In a preferred embodiment the clustered system comprises at least one storage node and further at least one node arranged for exchanging the data traffic with an external device, whereby the latter node is further arranged for running on a different operating system than the storage node.

In a preferred embodiment at least one of the at least two nodes is arranged for exchanging the data traffic with an external device, preferably via a lossless Ethernet connection. In one embodiment this lossless Ethernet connection is part of the lossless Ethernet network provided between the at least two nodes. Alternatively, the lossless Ethernet connection is part of another lossless Ethernet network.

In an advantageous embodiment the external device is a high resolution editing client.

Preferably at least one of the nodes comprises processing means suitable for media applications. Some examples are transcoding, media file format rewrapping and conversion, quality checking, etc. . . . .

The invention also relates to an assembly of at least two clustered systems as previously described, whereby the at least two clustered systems are arranged for exchanging data traffic of at least one of the clustered file systems via an IP protocol over a dedicated lossless Ethernet network. That dedicated lossless Ethernet network is preferably a Data Centre Ethernet based network.

In one embodiment the dedicated network is at least part of the lossless Ethernet network of at least one of the at least two clustered systems, and possibly of both systems.

DETAILED DESCRIPTION OF THE INVENTION

Figure 1:
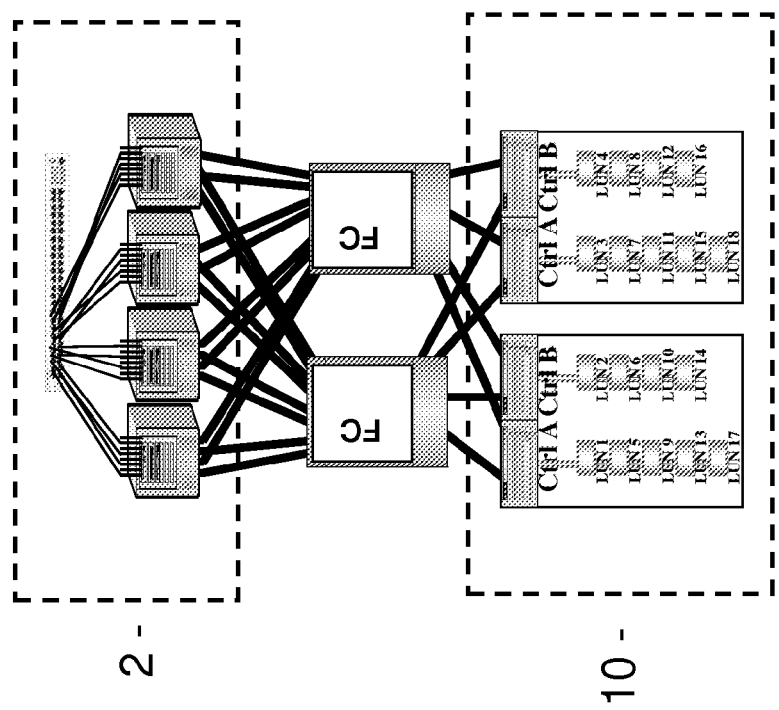
FIG. 1 illustrates a classical Fibre Channel based GPFS cluster architecture.
Figure 2:
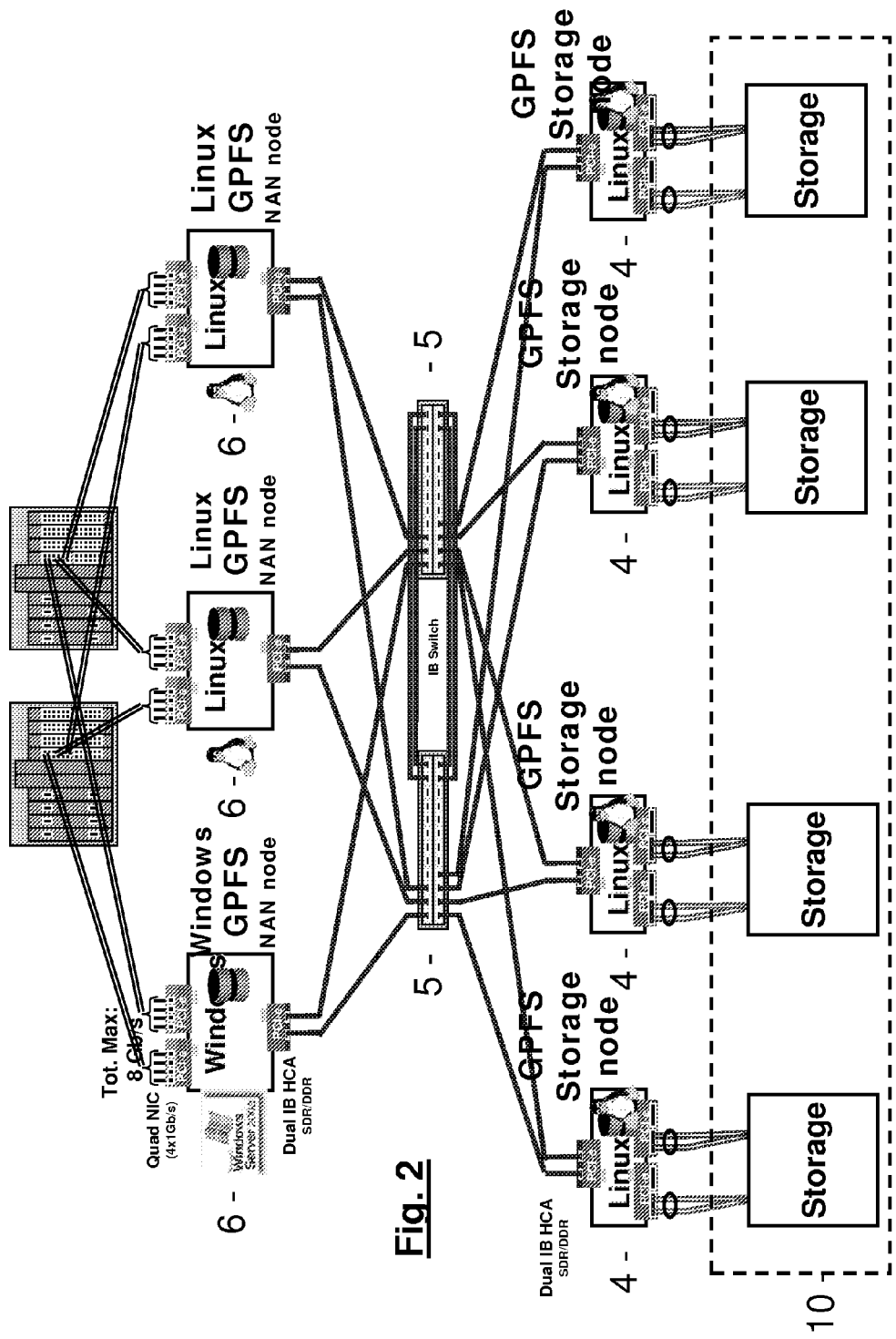
FIG. 2 illustrates an Infiniband (IB) based GPFS NAN node cluster as known in the prior art.
Figure 3:
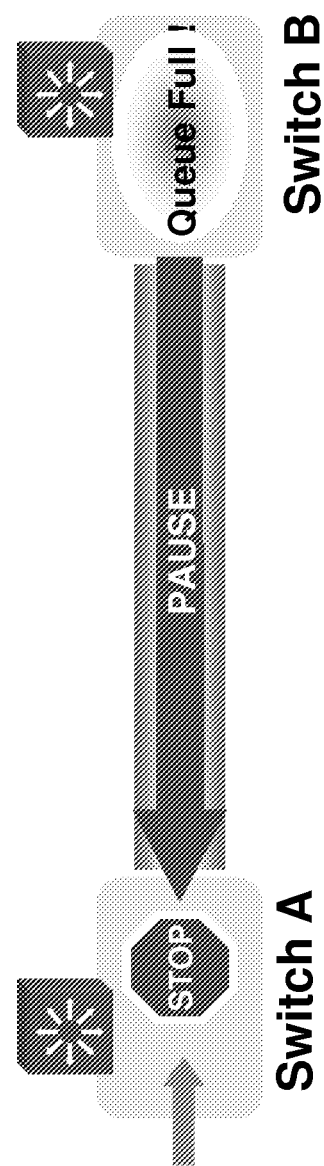
FIG. 3 illustrates the 802.3x PAUSE mechanism.

The present invention exploits the fact that Data Centre Ethernet (DCE) creates a lossless Ethernet fabric by slightly adapting, or expanding on, some known Ethernet standards. To achieve this, DCE uses an equivalent mechanism to buffer-to-buffer credits found in Fibre Channel and Infiniband to perform flow control without packet loss. This equivalent mechanism in Ethernet is based on the PAUSE frame defined in IEEE 802.3 (see FIG. 3). The PAUSE mechanism is used to inhibit packet transmission for a specified period of time when a receiving switch buffer is full. DCE is implemented on a new type of 10 Gb Ethernet network adapter, called Converged Network Adapter (CNA). These adapters provide full offload, also for the Microsoft Windows operating system. Contrary to classical 10 Gb/s Ethernet, DCE switches and ports are much cheaper by the use of SFP+ with a Copper Twinax Cable.

In a preferred embodiment the present invention exploits a priority mapping as known from priority flow control (PFC), the already mentioned DCE enhancement, to avoid traffic interference between different traffic flows. A PFC mechanism indeed allows mapping different traffic classes or flows onto a priority value. In PFC these priority values are defined in the three bit priority field of the IEEE 802.1Q tag. Eight different priorities can as such be distinguished. PFC allows the same PAUSE mechanism to be applied for each priority value or class, using a pause frame that carries only information for one, a few or all priorities. Hence the possibility for a selective flow control mechanism is created for the different traffic classes or flows related to different priority values.

Figure 4:
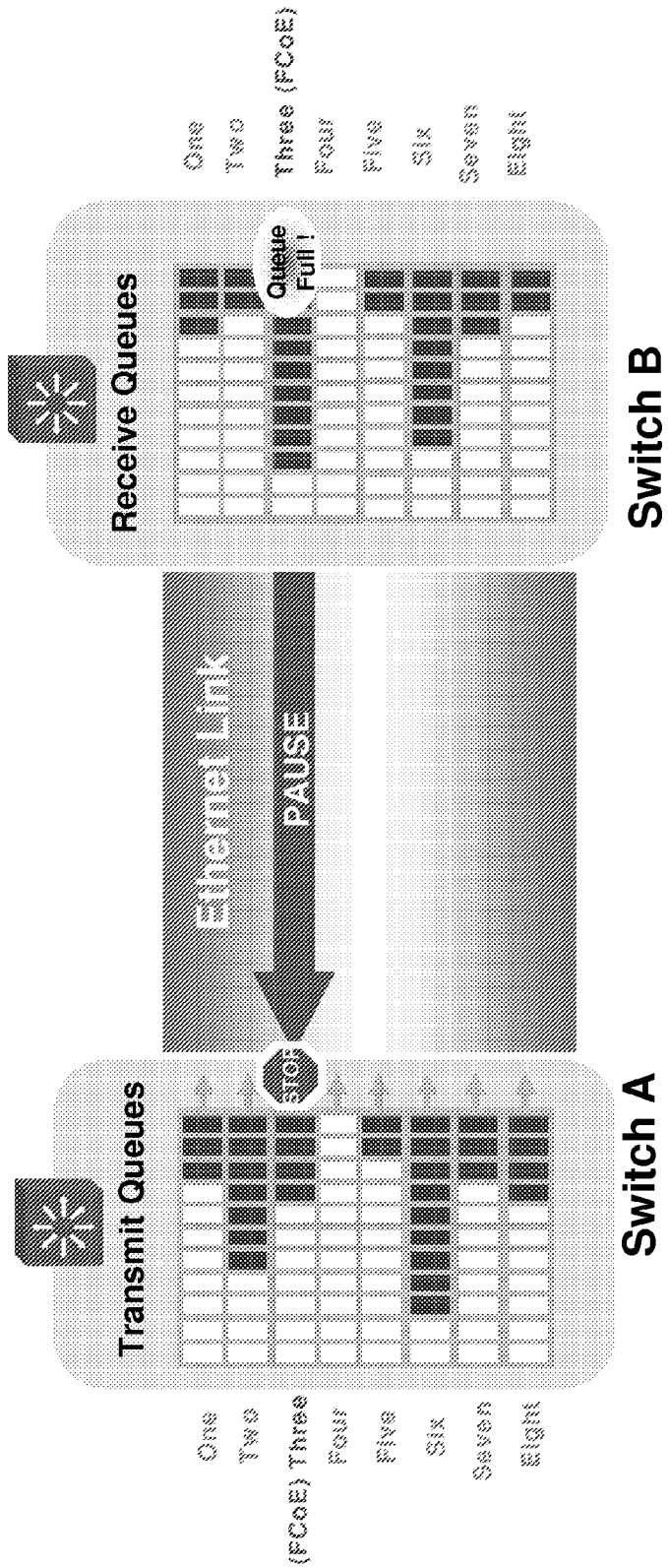
FIG. 4 illustrates the PFC PAUSE mechanism applied to a FCoE traffic class.

While 802.3x allows for the creation of a lossless Ethernet fabric for all traffic at the same time, regardless of some type of classification, implementations of PFC allow defining this lossless characteristic for a certain traffic class only. Hence, this feature has been used in the past to map storage traffic using the FC protocol to a specific priority value and to define the lossless characteristic for this class (see FIG. 4). This allows transporting FC protocol based storage traffic losslessly over the same Ethernet fabric together with classical IP protocol traffic mapped to a priority value linked to a lossy characteristic. Contrary to the application of the lossless Ethernet fabric in the prior art to FC storage traffic, the present invention exploits the features of DCE, both 802.3x as well as PFC, for creating a lossless fabric for one or several IP protocol traffic classes.

The clustered system according to the present invention can support a clustered file system and comprises at least two nodes. The nodes may be storage nodes wherein a part of the clustered file system can be stored or nodes for exchanging data traffic with an external device. The clustered file system is typically a GPFS file system comprising a plurality of storage cluster nodes and cluster nodes for data exchange with an attached network, as already mentioned. However, a clustered system containing only storage nodes or only nodes for data exchange can be envisaged as well. The at least two nodes of the clustered system are connected via a lossless Ethernet network so that the nodes can exchange data traffic using only an IP protocol. The lossless Ethernet network is preferably a Data Centre Ethernet based network.

Figure 5:
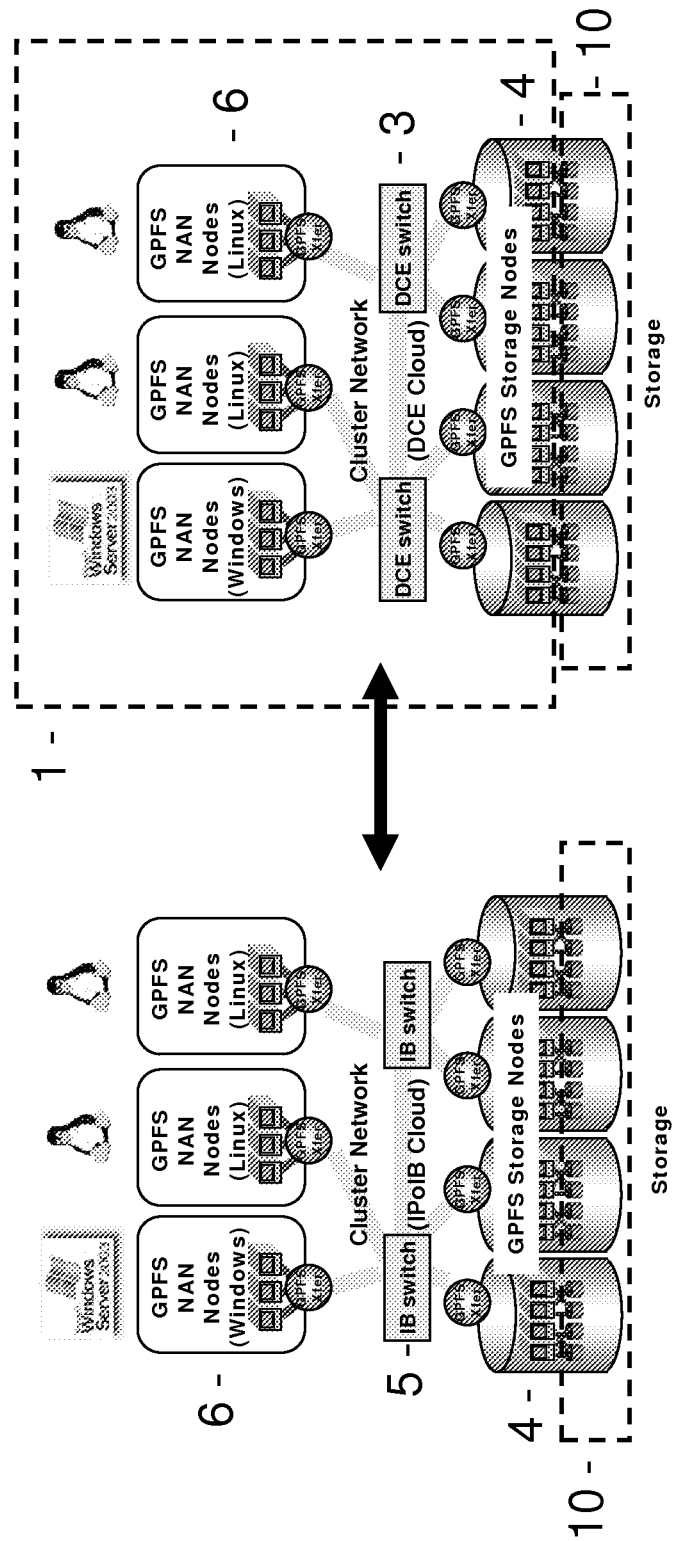
FIG. 5 compares a GPFS NAN node cluster based on IB (prior art) with one based on DCE (invention).

Since GPFS uses TCP/IP as network protocol and is agnostic to the underlying layer 2 (OSI model) network technology, the GPFS NAN cluster for data traffic exchange can be designed with the DCE technology (3) replacing the Infiniband as cluster network (see the example in FIG. 5). This is especially beneficial in the Microsoft Windows NAN node environment. Hence, a DCE based GPFS NAN cluster is able to make use of the full bandwidth provided by 10 Gb/s DCE. For this to succeed, the DCE technology capabilities have to match the Infiniband functionalities and performance on several levels:

It requires an offload performance of the DCE network adapters (CNA). comparable to that of the Infiniband network adapters (Host Channel Adapter (HCA)).

Although the flow control mechanism of DCE is equivalent to the Buffer-to-Buffer credit mechanism of Infiniband, the implementation of the PAUSE mechanism has to demonstrate a sufficient responsiveness to accomplish the lossless behaviour under the high requirements of the storage traffic of GPFS.

The buffering of the DCE switches has to be sufficient to support this mechanism in a successful way.

The DCE switches have to support sufficient virtual lanes or equivalent P-values to guarantee adequate cluster scalability.

The implementation of the DCE technology in the GPFS NAN cluster architecture has to match the performance, scalability and high availability requirements, provided by the Infiniband implementation.

Figure 6:
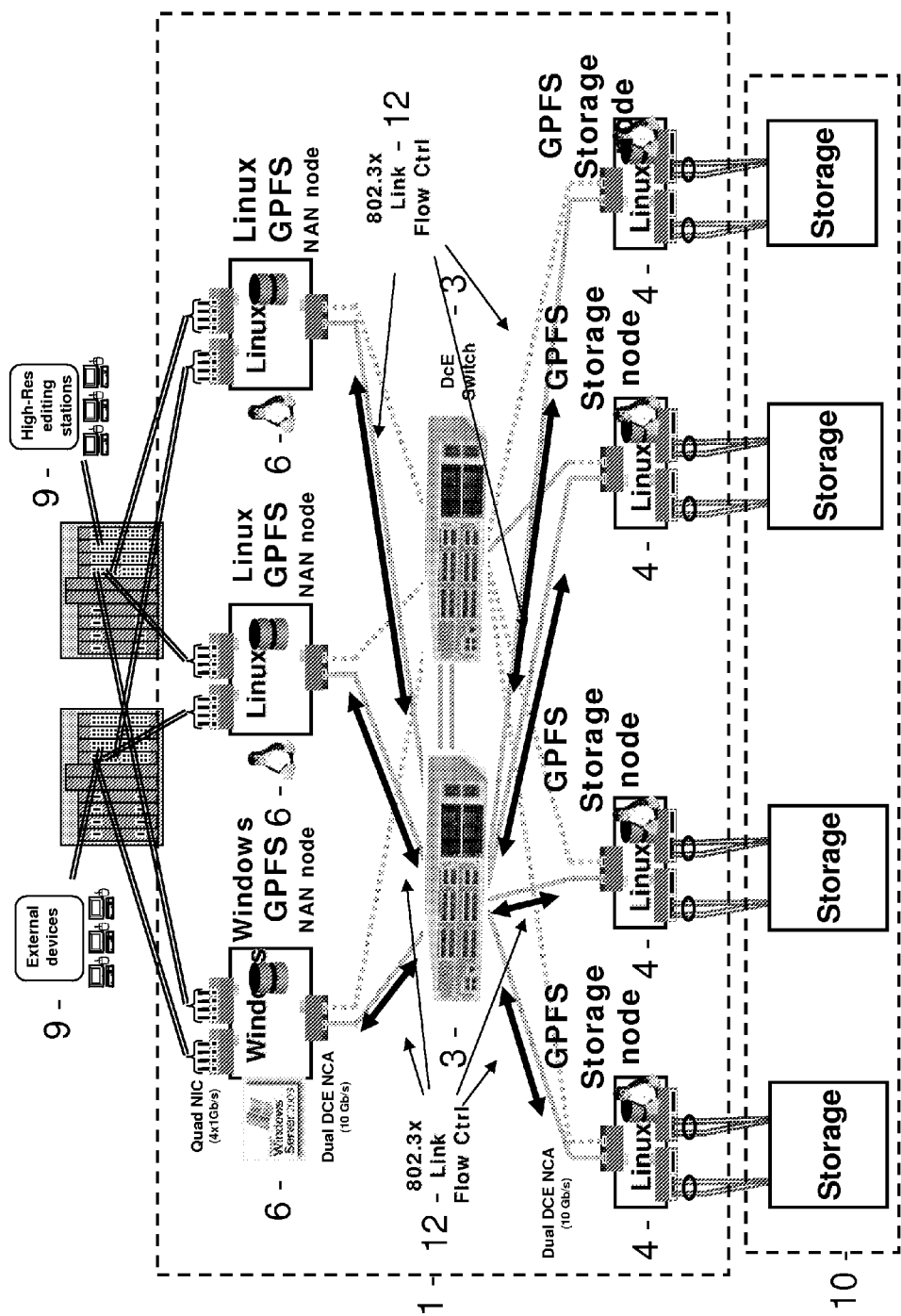
FIG. 6 illustrates a GPFS NAN node cluster according to an embodiment of the invention.

FIG. 6 illustrates an embodiment wherein some network attached nodes (6) (NAN) are in connection with a number of storage nodes (4). The storage nodes are in turn connected to a storage system (10) comprising a plurality of storage means. In the example shown the nodes are exchanging storage traffic with each other using an IP protocol only over a Data Centre Ethernet network. This Data Centre Ethernet network is using in this embodiment the 802.3x link flow control (12) to create a lossless Ethernet fabric.

Figure 7:
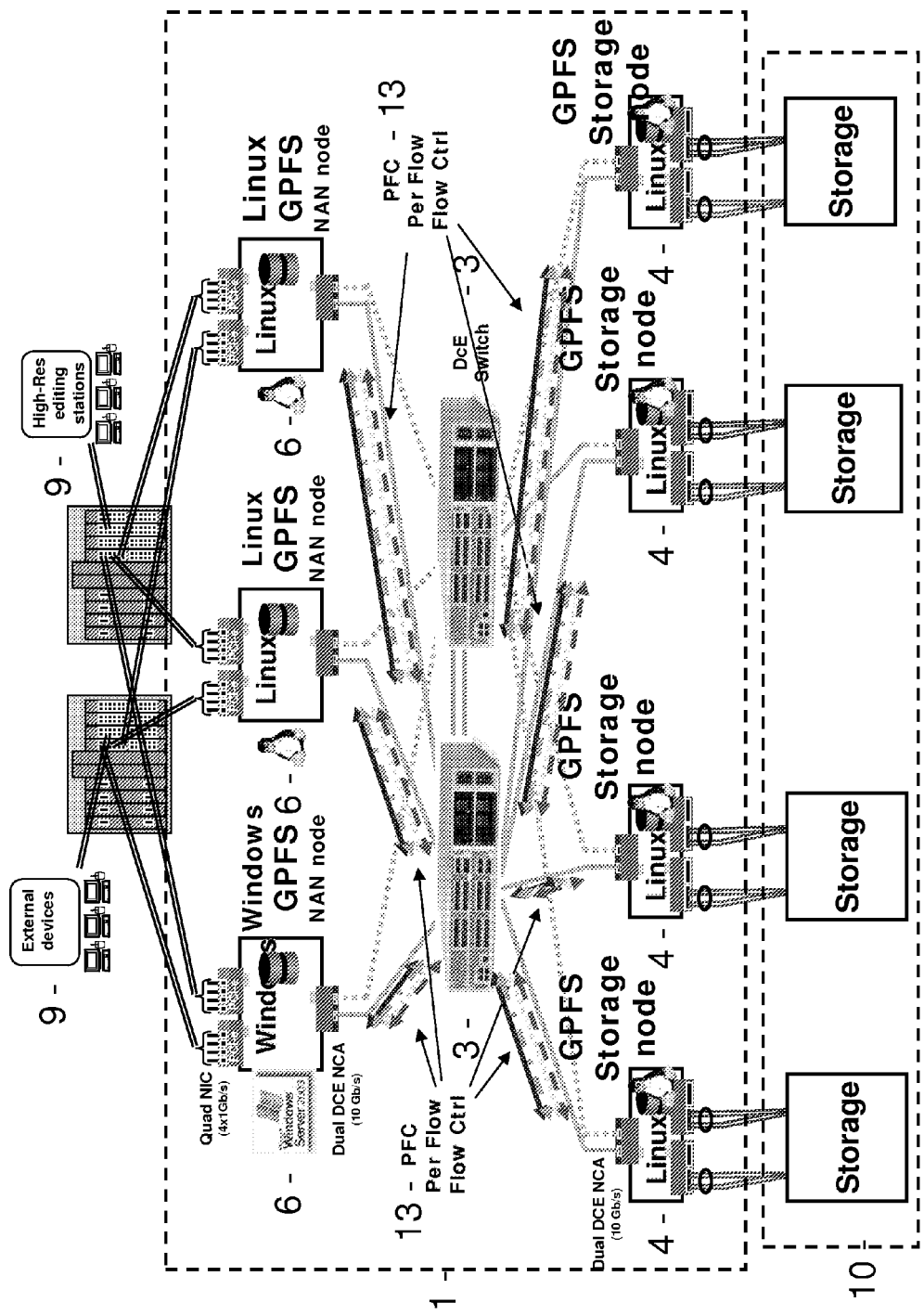
FIG. 7 illustrates a GPFS NAN node cluster according to an embodiment of the invention using PFC.
Figure 8:
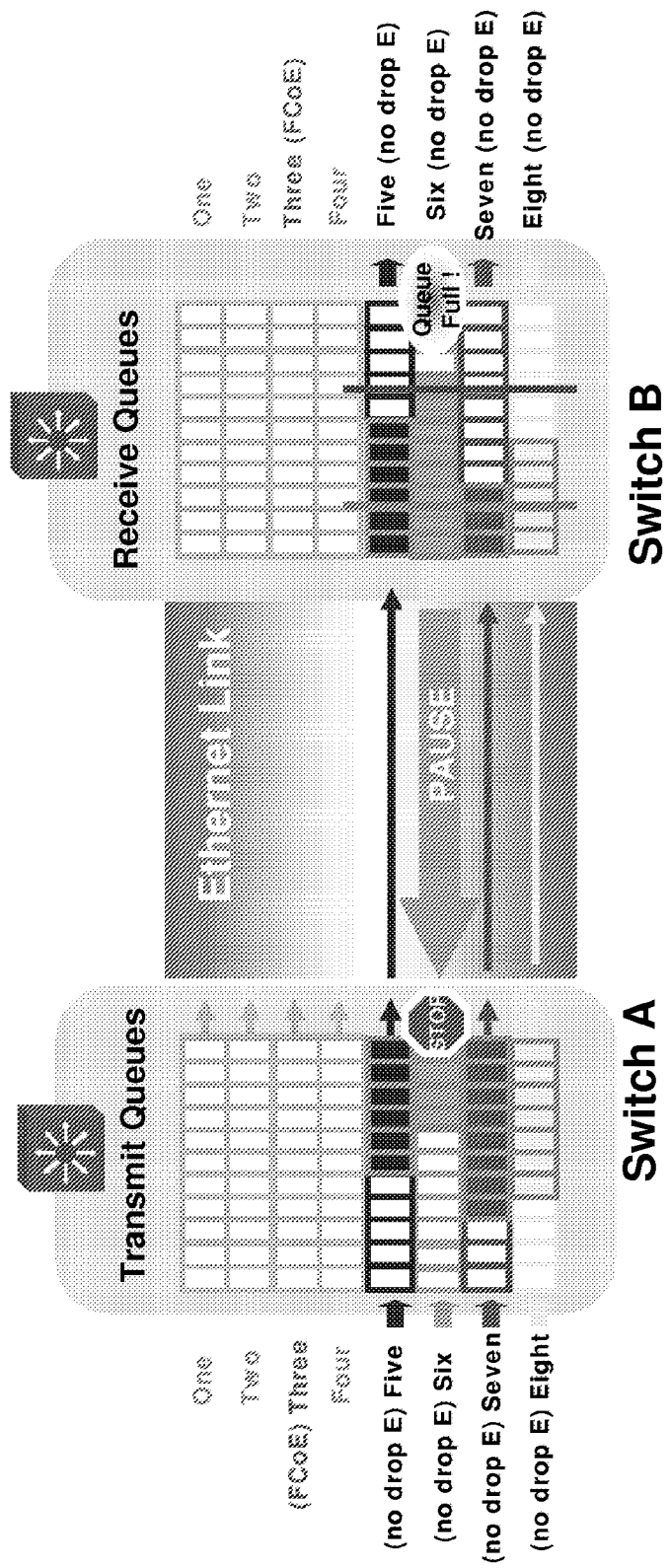
FIG. 8 illustrates the PFC PAUSE mechanism applied to a multitude of lossless IP protocol traffic classes.

FIG. 7 illustrates a preferred embodiment wherein the Data Centre network is using a PFC flow control mechanism (13). In this embodiment the IP traffic flows between different NAN nodes (6) and storage nodes (4) are mapped to different PFC values. FIG. 8 illustrates an example of such a mapping where 4 different IP traffic flows are mapped to 4 different PFC values, e.g. values 4 to 7. Each traffic class has been given a QoS characteristic of being a lossless Ethernet class. This allows for a separate flow control mechanism to be deployed per IP traffic flow between different NAN nodes (6) and storage nodes (4). This avoids any traffic interference caused by oversubscription of a link in the cluster network.

Any media service using a fit-for-purpose storage cluster that requires a Microsoft Windows based server or a mount of the central file system via the CIFS protocol can benefit from this architecture (see FIGS. 6 and 7).

Figure 9:
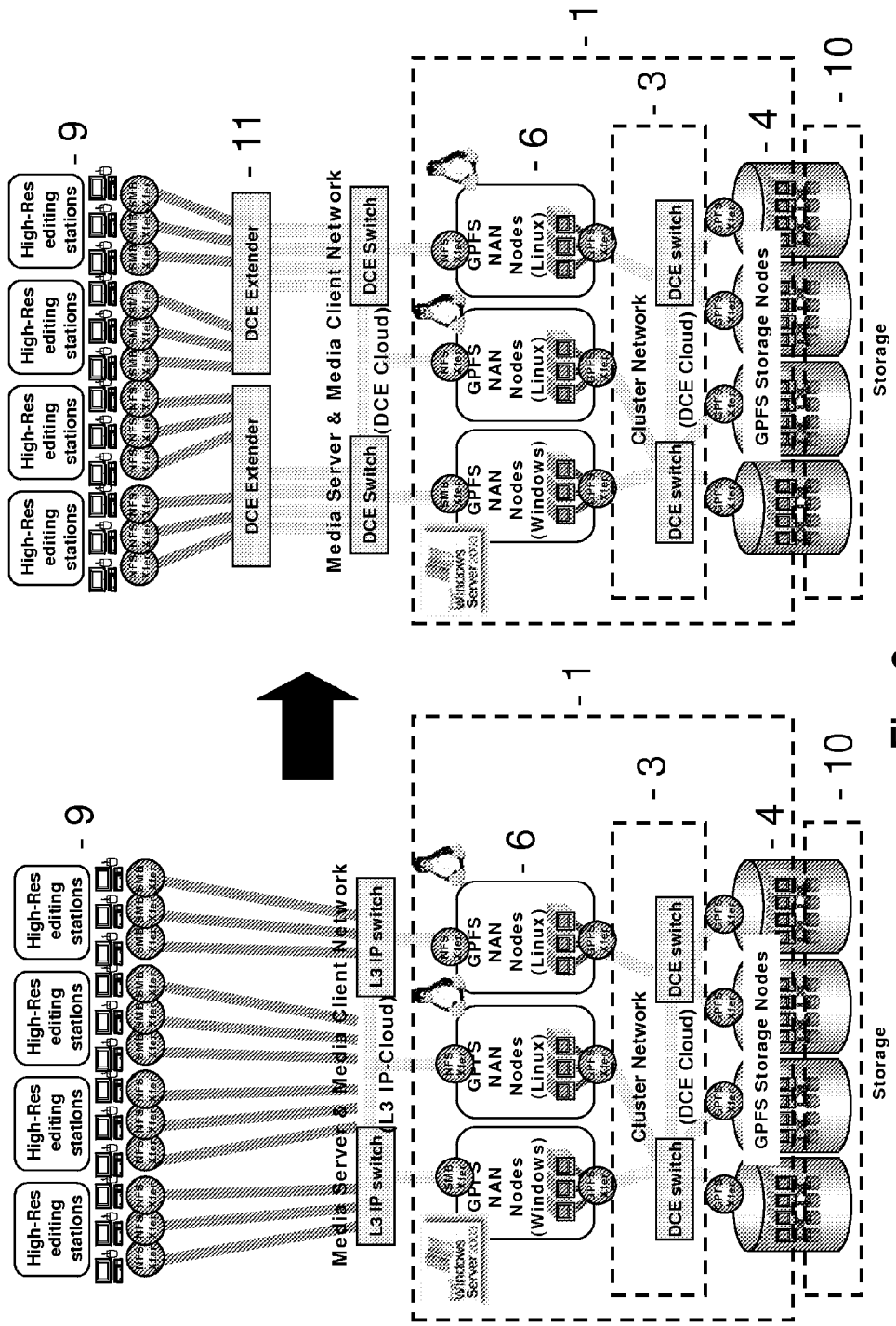
FIG. 9 illustrates a client network for central editing.

In a preferred embodiment of the invention at least one of the nodes is for exchanging data traffic with an external device via a lossless Ethernet network like a Data Centre Ethernet based network. DCE can for example be used to optimally accommodate the media traffic between a central GPFS clustered storage and high resolution editing client, as illustrated in FIG. 9.

Some media client applications prefer to access the central storage over the Network File System (NFS) protocol or the Server Message Block (SMB) protocol, both requiring Linux as operating system on the NAN node. Still other prefer the Common Internet File System (CIFS) protocol, requiring Windows on the NAN node. The media traffic between the editing clients and the central storage corresponds to a traffic class of small block file system traffic. This type of traffic is less bursty than the GPFS kind of storage type traffic, typically requiring bursts of 64 kB.

However, a new possible oversubscription does exist. In case the cluster NAN nodes are equipped with 10 Gb/s Ethernet at the client side, which is definitely the case when using DCE, and the media clients only have a 1 Gb/s Ethernet interface, a destination oversubscription from bandwidth mismatch between source and destination will occur. The PAUSE frame flow control mechanism of DCE could provide a natural solution for this problem. Since presently no 1 Gb/s DCE CNAs exist, the switch on the client side, the DCE extender (11) has to provide the PAUSE frames towards the 10 Gb/s server side. (The DCE extender provides the possibility to fan out the 10 Gb/s DCE ports of the DCE switch into 1 Gb/s Ethernet ports.)

Figure 10:
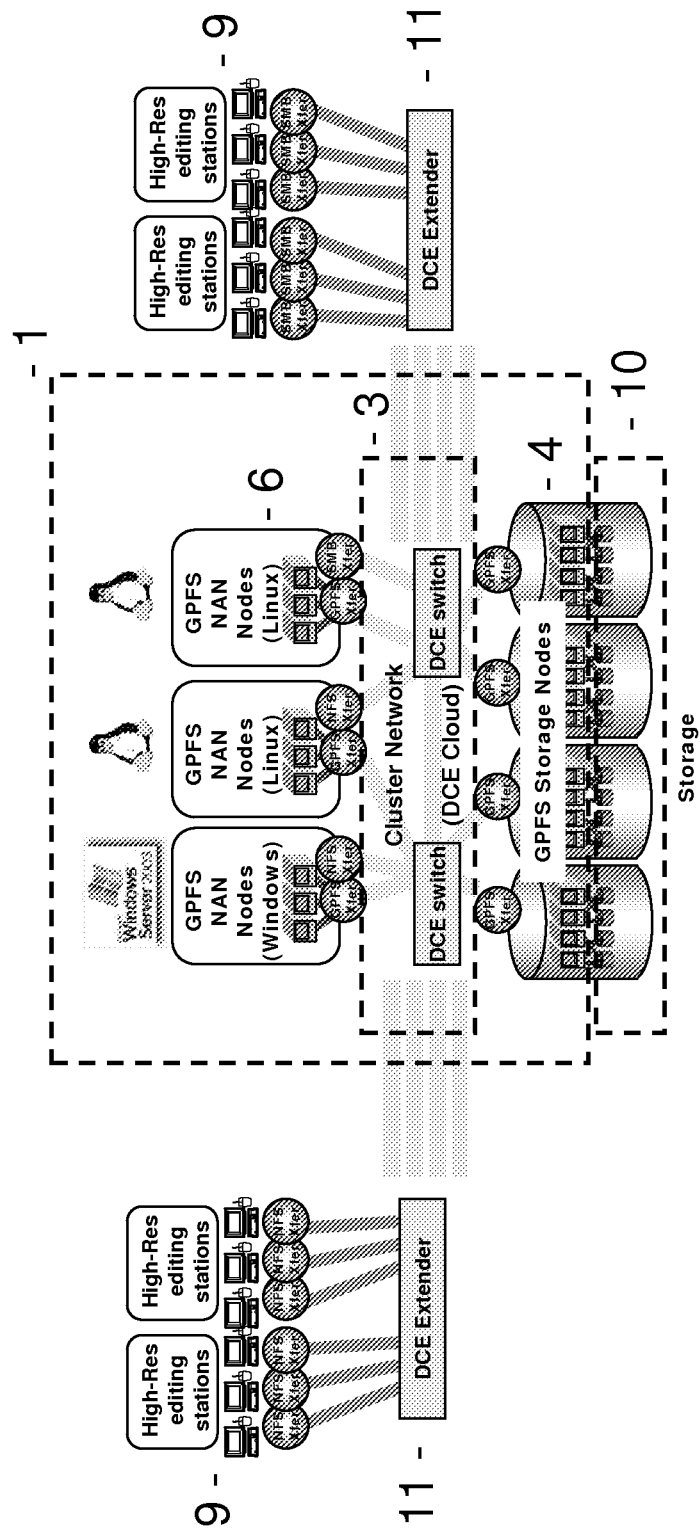
FIG. 10 illustrates a collapsed data centre Ethernet network.

The two network architectures, the cluster network and the editing client network, can be collapsed into one Data Center Ethernet based network, providing both functionalities (see FIG. 10). This may typically be practical and cost-effective in small scale environments.

It is to be noted that this invention is not limited to clusters based on the GPFS file system only. On the contrary, the proposed solution can be applied to any cluster based on another file system using IP protocols as network protocol.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A clustered system comprising:
a set of connected computers working as a single system, the set comprising:
  a first node; and
  a second node communicatively coupled with the first node via a lossless Ethernet network such that the first and second nodes exchange data storage traffic of a clustered file system between each other via an IP protocol over the lossless Ethernet network, the clustered file system being simultaneously mountable via multiple servers and arranged for performing reading and writing operations on the data storage traffic in a many-to-one traffic pattern,
wherein the data storage traffic comprises different data traffic flows.

2. The clustered system as in claim 1, wherein said lossless Ethernet network is a Data Center Ethernet based network.

3. The clustered system as in claim 1, wherein said lossless Ethernet network is arranged for applying a Priority Flow Control mechanism to map the different data traffic flows on a plurality of lossless IP over Ethernet traffic classes, providing said different data traffic flows an independent flow control mechanism.

4. The clustered system as in claim 1, wherein at least one of said nodes is a storage node arranged for storing at least a part of said clustered file system.

5. The clustered system as in claim 4, wherein said storage node comprises local storage means.

6. The clustered system as in claim 4, wherein said storage node is arranged for being connected to external storage means.

7. The clustered system as in claim 4, further comprising a node arranged for exchanging said data storage traffic with an external device, said node further arranged for running on a different operating system than said storage node.

8. The clustered system as in claim 1, wherein at least one of said nodes is arranged for exchanging said data storage traffic with an external device.

9. The clustered system as in claim 8, wherein said at least one node is arranged for exchanging said data storage traffic with an external device via a lossless Ethernet connection.

10. The clustered system as in claim 9, wherein said lossless Ethernet connection is a part of said lossless Ethernet network.

11. The clustered system as in claim 8, wherein said external device is a high resolution editing client.

12. The clustered system as in claim 1, wherein at least one of said nodes comprises processing means for media applications.

13. An assembly of at least two clustered systems as in claim 1, whereby said at least two clustered systems are arranged for exchanging data traffic of at least one of the clustered file systems via an IP protocol over a dedicated lossless Ethernet network.

14. The assembly as in claim 13, wherein said dedicated lossless Ethernet network is a DataCenter Ethernet based network.

15. The assembly as in claim 13, wherein said dedicated lossless Ethernet network is at least part of the lossless Ethernet network of at least one of said at least two clustered systems.

16. A clustered system comprising:
a first node; and
a second node communicatively coupled with the first node via a lossless Ethernet network such that the first and second nodes exchange data traffic of a clustered file system between each other via an IP protocol over the lossless Ethernet network,
wherein the lossless Ethernet network applies a Priority Flow Control mechanism to map different data traffic flows on a plurality of lossless IP over Ethernet traffic classes so as to provide an independent flow control mechanism to the different data traffic flows.

* * * * *